Jan. 6, 1948.        J. O. CULPEPPER         2,433,894
                    POULTRY FEEDER
          Filed June 14, 1944      2 Sheets-Sheet 1
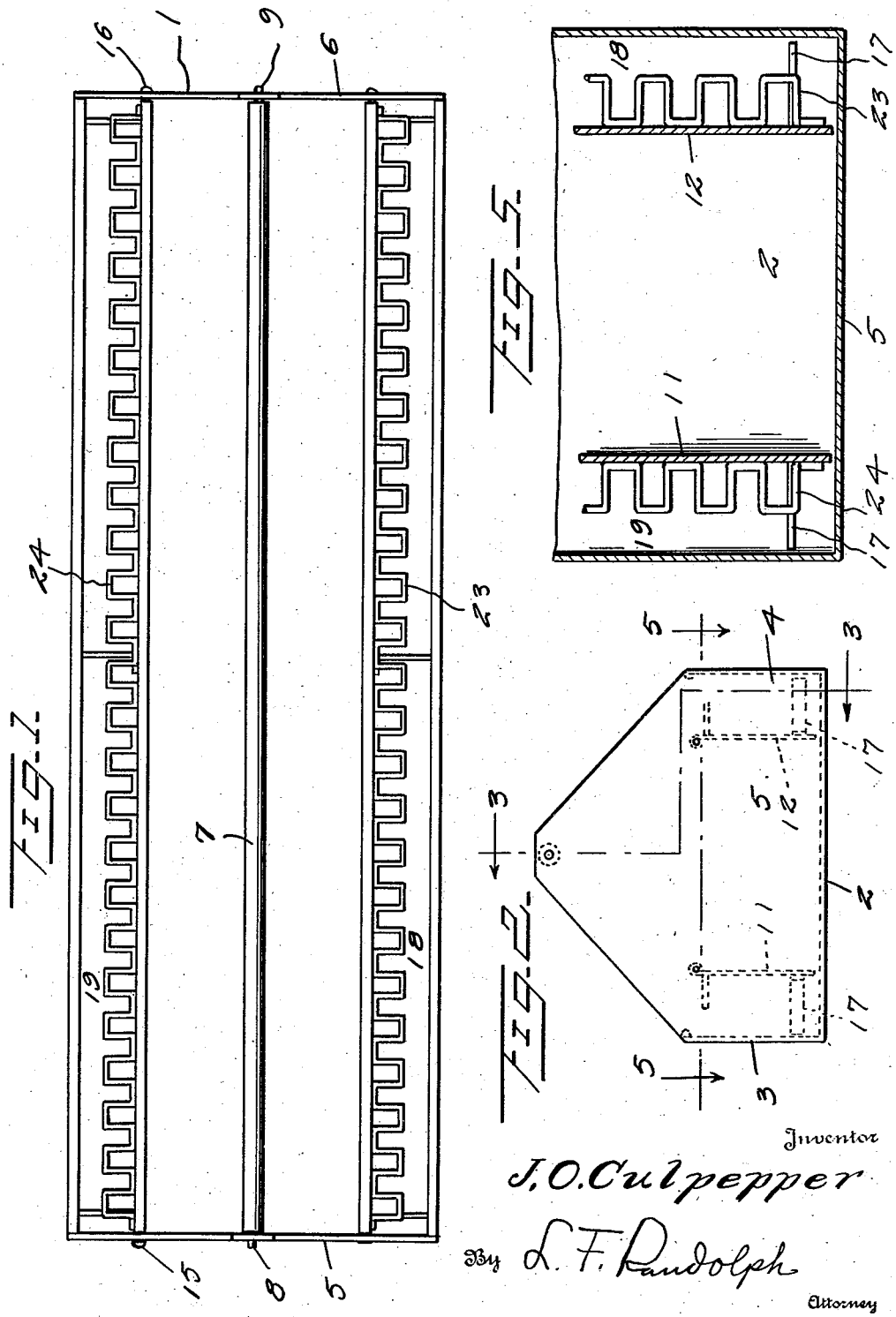
Inventor
J. O. Culpepper
By L. F. Randolph
Attorney

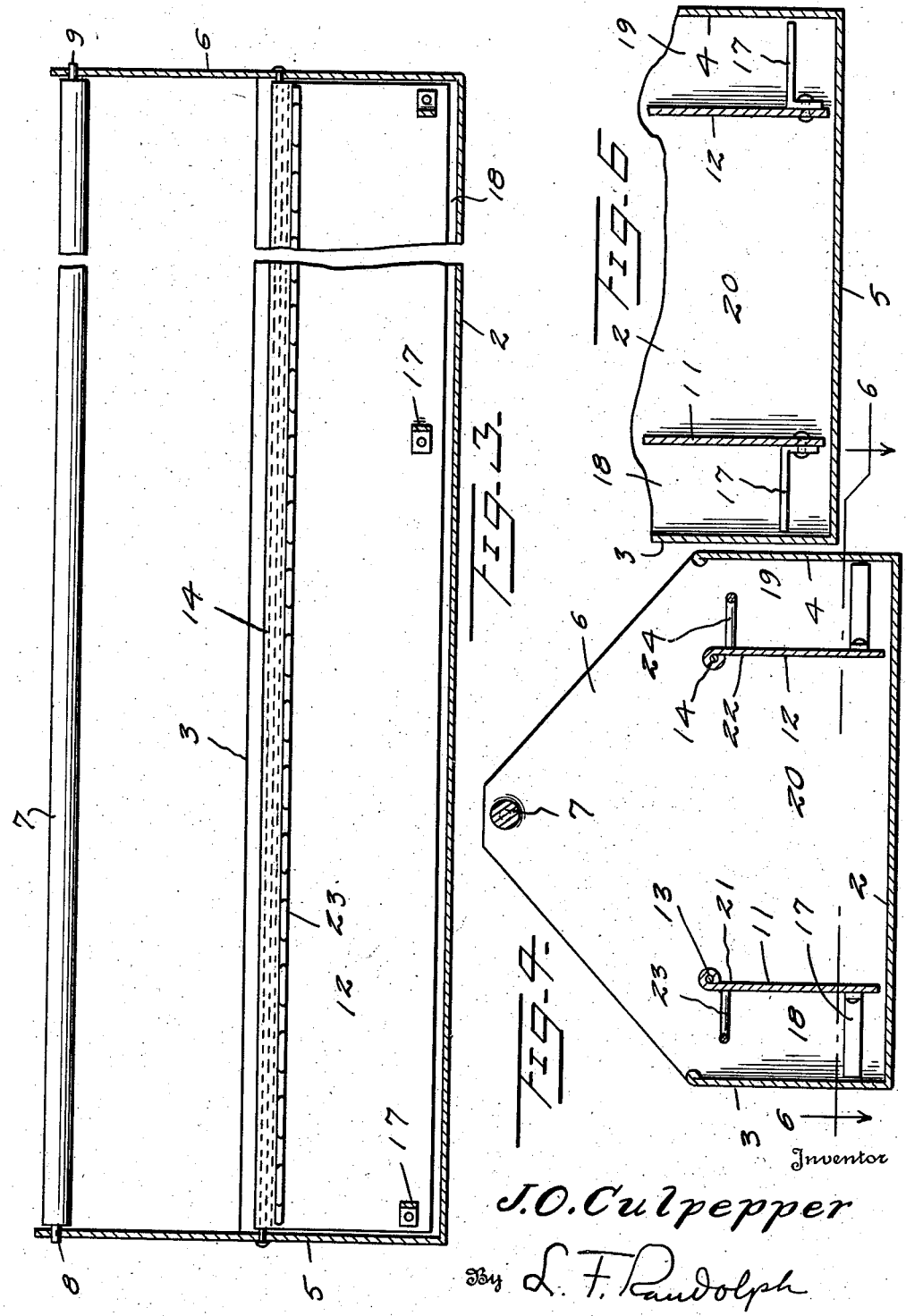

Patented Jan. 6, 1948

2,433,894

UNITED STATES PATENT OFFICE 2,433,894

POULTRY FEEDER

John O. Culpepper, Chatham, La.

Application June 14, 1944, Serial No. 540,188

1 Claim. (Cl. 119—61)

This invention relates to improvements in poultry feeding devices, and has for its object to provide a feeding trough from which the feed contained therein cannot be readily wasted by the fowl using the same.

Another object of the invention is to provide a poultry feeding device embracing troughs for receiving feed which would otherwise be wasted.

Another object of the invention is to provide a poultry feeder comprising a plurality of compartments and swinging walls separating said compartments.

A further object of the invention is to provide a poultry feeder having a plurality of feed-receiving compartments certain of which have guards over the tops thereof.

With the above and such other objects in view which would be disclosed in the body of the following specification I have invented the device illustrated in the drawings accompanying this application:

Figure 1 is a top plan view of my improved poultry feeder,

Figure 2 is an end elevational view of the device,

Figure 3 is a longitudinal sectional view of my device taken on line 3—3 of Figure 2, Figure 4 is a transverse sectional view of the feeder, Figure 5 is a sectional view taken on line 5—5 of Figure 2, and Figure 6 is a section taken on line 6—6 of Figure 4.

In the following specification as well as in the accompanying drawings similar characters of reference indicate like parts throughout, and in which 1 indicates a poultry feeding trough having a bottom 2, side walls 3 and 4 and end walls 5 and 6. The walls 5 and 6 have tapered upper portions extending above the walls 3 and 4 and apertured to receive pins 8 and 9 which are journaled therein and project from the ends of a roller and handle 7. Spaced apart from the walls 3 and 4, are provided swinging walls 11 and 12, which do not extend quite to the bottom 2, of the device. These walls have their upper edges 13 and 14, rolled to form tubes into the ends of which elongated pivot pins 15 and 16 are projected through apertures in the said end walls whereby walls 11 and 12 may swing freely inwardly. These walls are provided at their lower ends with spaced-apart stop fingers 17 whereby the walls are prevented from swinging outwardly into contact with the walls 3 and 4. The walls 3 and 11, and 4 and 12, form waste receptacles for feed which is usually thrown out of the feeder by the poultry picking therein. The purpose of the swinging walls is such that when the feeder is empty or partially empty by tilting the feeder, first in one direction and then in the other, the feed contained in the receptacles 18 and 19, may be shifted to the central compartment 20 of the feeder as the walls 11 and 12, will swing inwardly on said tilting action. Attached to the walls 11 and 12, adjacent the upper ends 21 and 22, respectively thereof, and projecting outwardly over the compartments 18 and 19, are guard members 23 and 24, which are formed of wire bent back and forth throughout the length thereof to prevent the poultry from attempting to eat from said compartments 18 and 19.

Having now described my invention, that which I claim to be new and desire to secure by Letters Patent is:

In combination with a poultry feeding trough having a vertical side wall, vertical end walls, a flat bottom and an open top, a partition disposed in the trough and longitudinally thereof, said partition having pins projecting from its ends and upper edge and journaled in said end walls for swingably mounting the partition for movement toward and away from said side wall and for normally supporting it substantially parallel thereto, said partition having stops extending therefrom toward said side wall for limiting the swinging movement of the partition toward the side wall, and an undulated guard member carried by the partition and disposed between the side wall and partition, said guard member and stops normally being disposed out of contact with said side wall.

JOHN O. CULPEPPER.

REFERENCES CITED

The following references are of record in the file of this patent:

UNITED STATES PATENTS

| Number | Name | Date |
|---|---|---|
| 1,469,013 | Jacobus | Sept. 25, 1923 |
| 2,350,461 | Ivey | June 6, 1944 |
| 1,437,462 | Belvel | Dec. 5, 1922 |
| 1,322,698 | Johnson | Nov. 25, 1919 |
| 1,815,512 | Kopetka | July 21, 1931 |
| 1,794,589 | Collins | Mar. 3, 1931 |
| 832,094 | Surface | Oct. 2, 1906 |